United States Patent
Hapsari et al.

(10) Patent No.: US 10,904,806 B2
(45) Date of Patent: Jan. 26, 2021

(54) CORE NETWORK AND BASE STATION

(71) Applicant: NTT DOCOMO, INC., Tokyo (JP)

(72) Inventors: Wuri Andarmawanti Hapsari, Tokyo (JP); Tooru Uchino, Tokyo (JP); Hideaki Takahashi, Tokyo (JP); Ryusuke Matsukawa, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/324,200

(22) PCT Filed: Aug. 14, 2017

(86) PCT No.: PCT/JP2017/029324
§ 371 (c)(1),
(2) Date: Feb. 8, 2019

(87) PCT Pub. No.: WO2018/030545
PCT Pub. Date: Feb. 15, 2018

(65) Prior Publication Data
US 2019/0174375 A1    Jun. 6, 2019

(30) Foreign Application Priority Data

Aug. 12, 2016  (JP) .................. 2016-158761

(51) Int. Cl.
*H04W 36/02* (2009.01)
*H04W 28/10* (2009.01)
*H04W 36/08* (2009.01)
*H04W 88/14* (2009.01)

(52) U.S. Cl.
CPC ........... *H04W 36/02* (2013.01); *H04W 28/10* (2013.01); *H04W 36/08* (2013.01); *H04W 88/14* (2013.01)

(58) Field of Classification Search
CPC ..... H04W 36/02; H04W 88/14; H04W 36/08; H04W 28/10; H04W 28/02; H04W 28/0205; H04W 28/021; H04W 28/0247; H04W 28/0252; H04W 28/0257;
(Continued)

(56) References Cited

U.S. PATENT DOCUMENTS

| 9,479,934 | B2* | 10/2016 | Agarwal ............. H04L 63/0884 |
| 9,854,499 | B2* | 12/2017 | Wang .................... H04W 28/12 |
| 10,187,928 | B2* | 1/2019 | Karandikar ........... H04W 88/16 |

(Continued)

FOREIGN PATENT DOCUMENTS

EP    3461209 A1    3/2019

OTHER PUBLICATIONS

Nokia, et al.; "On tunnelling to carry User plane flows within the NG Core and on NG3"; SA WG2 Meeting #116 S2-163608; Vienna, Austria, Jul. 11-15, 2016 (3 pages).

(Continued)

*Primary Examiner* — Sharad Rampuria
(74) *Attorney, Agent, or Firm* — Osha Bergman Watanabe & Burton LLP

(57) ABSTRACT

A core network is disclosed that includes a flow control unit that switches a path of a data flow having a flow identifier and a flow priority from a first base station to a second base station and an end marker generating unit that generates, for each tunnel, an end marker of a data flow transferred from the first base station to the second base station via a tunnel. In other aspects, a base station is also disclosed.

4 Claims, 9 Drawing Sheets

(58) Field of Classification Search
CPC ......... H04W 28/0263; H04W 28/0268; H04W 28/0273; H04L 47/10
See application file for complete search history.

(56) References Cited

U.S. PATENT DOCUMENTS

2016/0044721 A1* 2/2016 Mhatre ................. H04W 76/22
370/329
2019/0174377 A1* 6/2019 Decarreau ........... H04W 36/023

OTHER PUBLICATIONS

Nokia, Alcatel-Lucent Shanghai Bell; "Context Aware QoS Framework for GBR services"; SA WG2 Meeting #116 S2-163533; Vienna, Austria, Jul. 11-15, 2016 (10 pages).
Intel; "Update to Solution 2.2"; SA WG2 Meeting #116 S2-163672; Vienna, AT, Jul. 11-15, 2016 (8 pages).
Huawei; "Data Forwarding Resource Release"; 3GPP TSG-RAN WG3#63 R3-090169; Athens, Greece, Feb. 9-13, 2009 (3 pages).
3GPP TS 23.401 V14.0.0; "3rd Generation Partnership Project; Technical Specification Group Services and System Aspects; General Packet Radio Service (GPRS) enhancements for Evolved Universal Terrestrial Radio Access Network (E-UTRAN) access (Release 14)"; Jun. 2016 (374 pages).
International Search Report issued for PCT/JP2017/029324, dated Oct. 24, 2017 (5 pages).
Written Opinion issued for PCT/JP2017/029324, dated Oct. 24, 2017 (4 pages).
Extened European Search Report issued in Application No. 17839609.9, dated Dec. 4, 2019 (18 pages).
3GPP SA WG2 Meeting #116; S2-163742; "Interim agreements on QoS framework;" Drafting; Jul. 11-15, 2016; Vienna, AT (2 pages).

* cited by examiner

CORE NETWORK AND BASE STATION

TECHNICAL FIELD

The present invention relates to a radio communication system.

BACKGROUND ART

In a long term evolution (LTE) system and an LTE-advanced system, a radio bearer (data radio bearer (DRB)) is set in a section between a user equipment and a base station, and an S1 bearer (an S1 GTP (general packet radio service (GPRS) tunnel) is set in a section between a base station and a core network. Further, the radio bearer and the S1 bearer are mapped in a one-to-one manner.

In handover control by the LTE system, as illustrated in FIG. 1, order control of: data transferred from a source base station to a target base station through an X2 interface; and new (fresh) data transmitted from the core network to the target base station through an S1 interface, is performed in the target base station. Specifically, after last transfer data is transmitted, the core network transmits an end marker indicating transfer completion to the source base station. The source base station transfers the received transfer data and the end marker to the target base station, and when the end marker is received, the target base station starts to transmit new data corresponding to the received end marker to the user equipment. In the LTE system, X2 tunnels which are equal in number to transfer target bearers are set on an X2 interface between the source base station and the target base station, and data is transferred from the source base station to the target base station via the tunnels.

CITATION LIST

Non-Patent Document

Non-Patent Document 1: 3GPP TS 23.401 V14.0.0 (2016-06)

SUMMARY OF THE INVENTION

Problem to be Solved by the Invention

Meanwhile, in third generation partnership project (3GPP), standardization for a next generation (Next Gen) or fifth generation (5G) has been discussed. In the 5G system, as illustrated in FIG. 2, a technique in which one tunnel (tunnel ID) is set between the source base station and the target base station for each access point name (APN) instead of a tunnel for each bearer, and data flows having different flow identifiers (Flow ID) and flow priorities (Flow Priority Index (FPI)) are transmitted via the tunnel has been proposed. In other words, data flows having different data flow identifiers and flow priorities are mixed in the tunnel.

However, a method of generating an end marker for each data flow to be transferred via the tunnel set for each APN has not been reviewed yet.

In light of the above problem, it is an object of the present invention to provide a scheme of generating an end marker for a data flow in flow-based handover transfer control.

Means for Solving Problem

In order to solve the above-mentioned problem, one aspect of the present invention relates to a core network which includes a flow control unit that switches a path of a data flow having a flow identifier and a flow priority from a first base station to a second base station and an end marker generating unit that generates an end marker of a data flow transferred from the first base station to the second base station via a tunnel in accordance with a generation rule based on one or more of the flow identifier, the flow priority, and the tunnel.

Effect of the Invention

According to the present invention, it is possible to provide a scheme of generating an end marker for a data flow in flow-based handover transfer control.

MODE(S) FOR CARRYING OUT THE INVENTION

Hereinafter, exemplary embodiments of the present invention will be described with reference to the appended drawings.

In the following embodiments, a core network, a base station, and a user equipment that implement flow-based handover control of transferring a data flow from a source base station to a target base station via a tunnel in which data flows having different flow identifiers and flow priorities are mixed are disclosed. As a brief overview of the embodiments to be described later, in handover data transfer, the core network generates an end marker of a data flow for each flow identifier, for each combination of a flow identifier and a flow priority, for each flow priority, or for each tunnel, and transmits the end marker to the source base station. The source base station sets one tunnel for each APN and transfers data flows having different flow identifiers and flow priorities to the target base station via the tunnel. Upon receiving the end marker indicating completion of data flow transfer, the target base station starts to transmit the data flow corresponding to the received end marker which is received from the core network to the user equipment.

Figure 1:
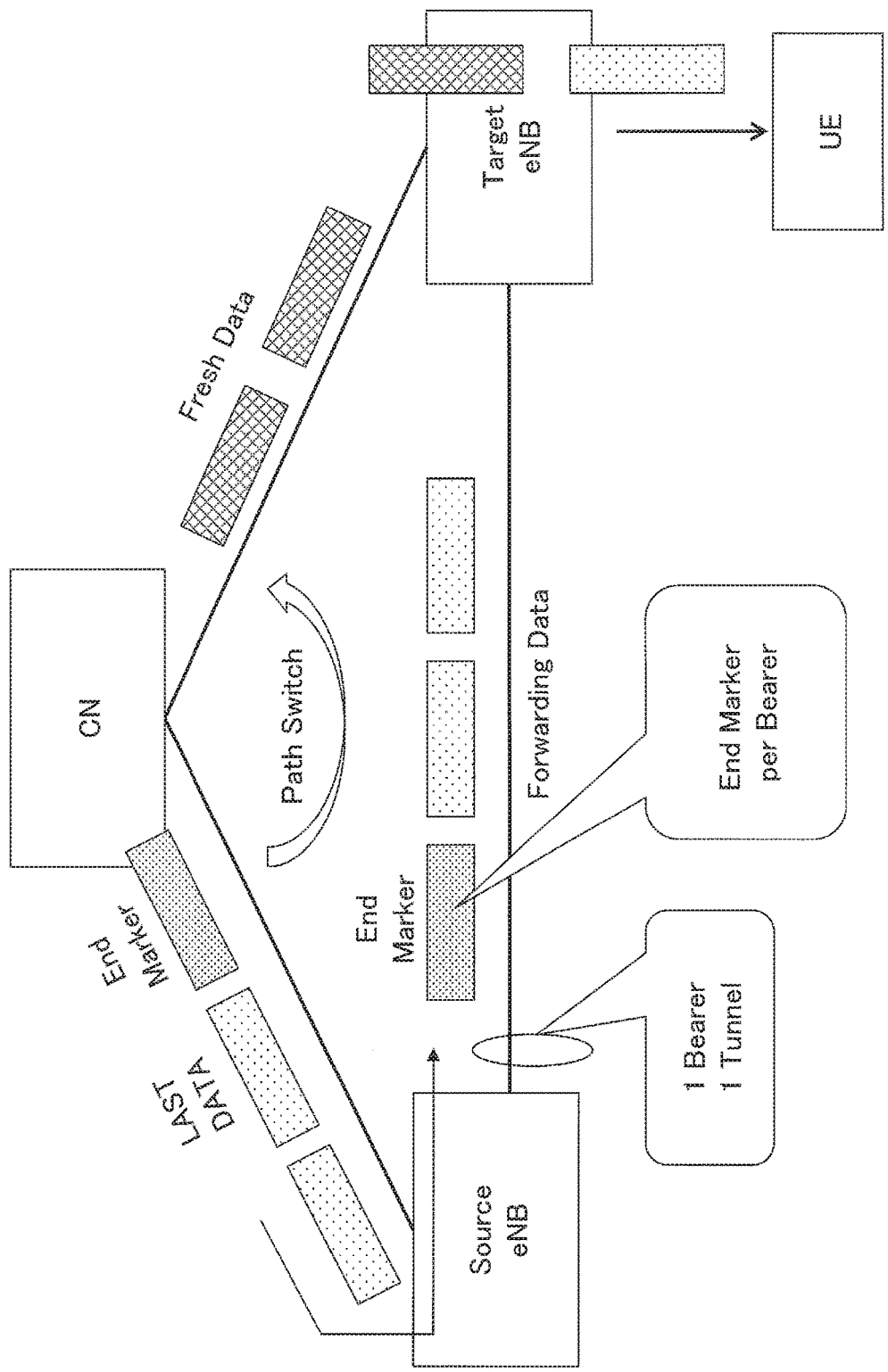
FIG. 1 is a schematic diagram illustrating handover transfer control in an LTE system.
Figure 2:
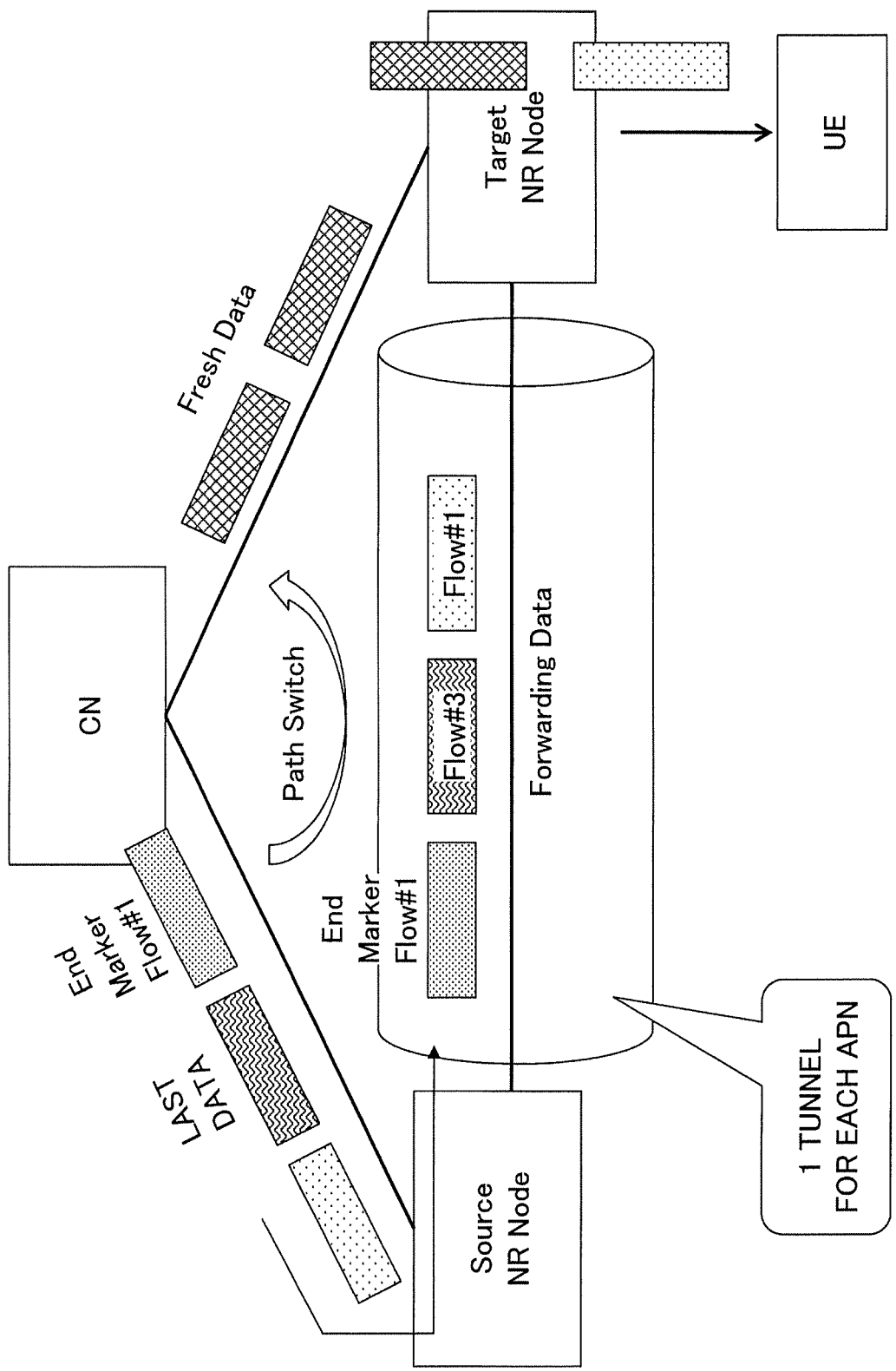
FIG. 2 is a schematic diagram illustrating flow-based handover transfer control.
Figure 3:
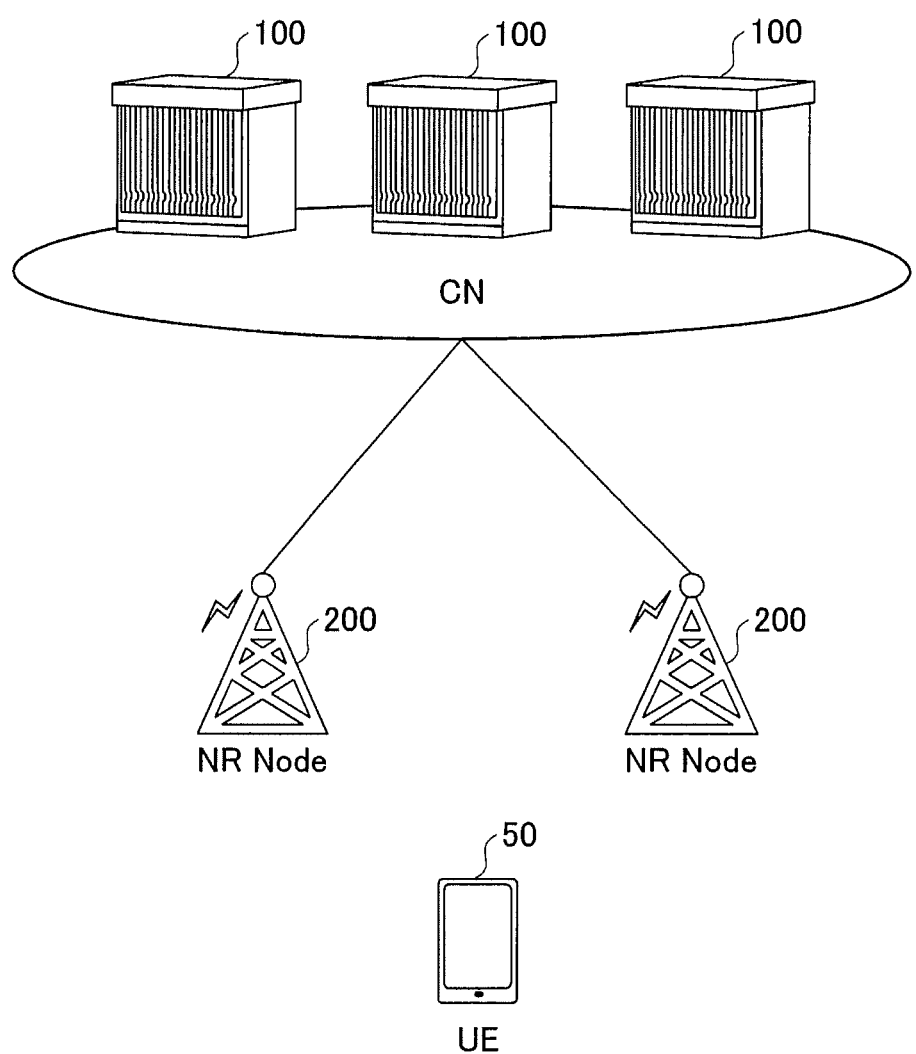
FIG. 3 is a schematic diagram illustrating a radio communication system according to one embodiment of the present invention.

First, a radio communication system according to one embodiment of the present invention will be described with reference to FIG. 3. FIG. 3 is a schematic diagram illustrating a radio communication system according to one embodiment of the present invention.

As illustrated in FIG. 3, the radio communication system 10 includes a user equipment (UE) 50, a base station (NR node) 200, and a core network (CN) 100. In the following embodiments, the radio communication system 10 is a radio communication system (for example, a 5G system) conforming to the Rel-14 or later standard of 3GPP, but the present invention is not limited thereto, the radio communication system 10 may be any other radio communication system to which the flow-based handover control is applied.

The user equipment 50 is any appropriate information processing device having a radio communication function such as a smartphone, a mobile phone, a tablet, a wearable terminal, a communication module for machine-to-machine (M2M), and is wirelessly connected to the base station 200 under the management of the core network 100 and uses various kinds of communication services provided in the radio communication system 10. In the following embodiments, the user equipment 50 performs transmission and reception of signals with the base station 200 using an AS layer conforming to an access stratum (AS) protocol, and performs transmission and reception of signals with the core network 100 using a non-access stratum (NAS) layer conforming to a NAS protocol.

The base station 200 provides one or more cells and performs radio communication with the user equipment 50 via the cell under the management of the core network 100 including a mobility management entity (MME), a serving-gateway (S-GW), a PDN GW, and the like. Only one the base station 200 is illustrated in the illustrated embodiment, but in general, a plurality of base stations 200 are arranged to cover a service area of the radio communication system 10.

The core network 100 manages the radio communication between the base station 200 and the user equipment 50 in accordance with various kinds of radio controls such as location registration, inter-base station handover, cell reselection, and intermittent reception control, and functions as a gateway between an external network such as the Internet and the user equipment 50. In the handover control, when a transmission path of downlink data destined for the user equipment 50 is switched from the source base station 200S to the target base station 200T (Path Switch), the core network 100 generates an end marker indicating transmission of a last data flow destined for the source base station 200S and transmits the end marker generated after the last data flow to the source base station 200S. Thereafter, the core network 100 transmits the downlink data destined for the user equipment 50 to the target base station 200T. The target base station 200T re-orders the data flow transferred from the source base station 200S and the data flow received from the core network 100, and transmits the data flows to the user equipment 50. Specifically, the target base station 200T transmits the data flow received from the source base station 200S to the user equipment 50 until the end marker is received from the source base station 200S, and buffers the data flow received from the core network 100. Then, upon receiving the end marker from the source base station 200S, the target base station 200T starts to transmit the buffered data flow corresponding to the received end marker to the user equipment 50.

In the following embodiments, in the flow-based handover control, the data flow is transferred from the source base station 200S to the target base station 200T via the tunnel set for each APN rather than for each radio bearer, and the data flows having different flow identifiers and flow priorities are transferred within one tunnel. The core network 100 generates an end marker indicating transfer completion of each data flow in accordance with a predetermined generation rule to be detailed below. Upon receiving the end marker from the source base station 200S, the target base station 200T starts to transmit new data corresponding to the received end marker received from the core network 100 to the user equipment 50.

Figure 4:
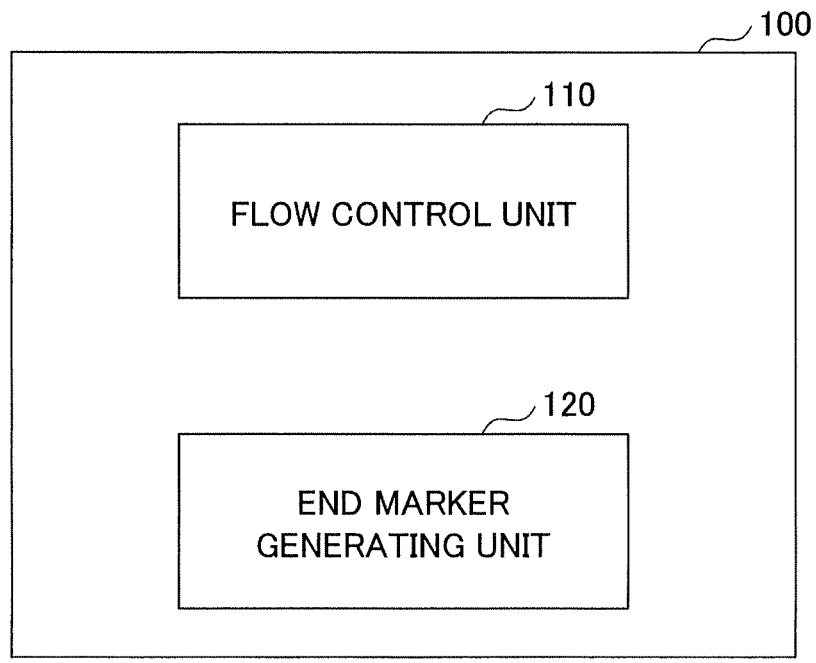
FIG. 4 is a block diagram illustrating a functional configuration of a core network according to one embodiment of the present invention.

Next, the core network according to one embodiment of the present invention will be described with reference to FIG. 4. FIG. 4 is a block diagram illustrating a functional configuration of the core network according to one embodiment of the present invention.

As illustrated in FIG. 4, the core network 100 includes a flow control unit 110 and an end marker generating unit 120.

The flow control unit 110 switches the path of the data flow having the flow identifier and the flow priority from the source base station 200S to the target base station 200T. Specifically, the flow control unit 110 allocates the flow identifier (Flow ID) and the flow priority (FPI) to each piece of data, and transmits the data to the source base station 200S and the target base station 200T in accordance with the data flow. Then, upon receiving a handover request to the target base station 200T from the source base station 200S for the user equipment 50, the core network 100 switches the transmission path of the downlink data destined for the user equipment 50 to the target base station 200T (Path Switch).

The end marker generating unit 120 generates the end marker of the data flow transferred from the source base station 200S to the target base station 200T via the tunnel in accordance with a generation rule based on one or more of the flow identifier, the flow priority, and the tunnel. Specifically, as will be described below in detail, the end marker generating unit 120 generates the end marker of the data flow for each flow identifier (Flow ID), each combination (Flow ID, FPI) of the flow identifier and the flow priority, each flow identifier (FPI), or each tunnel (Tunnel ID).

Figure 5:
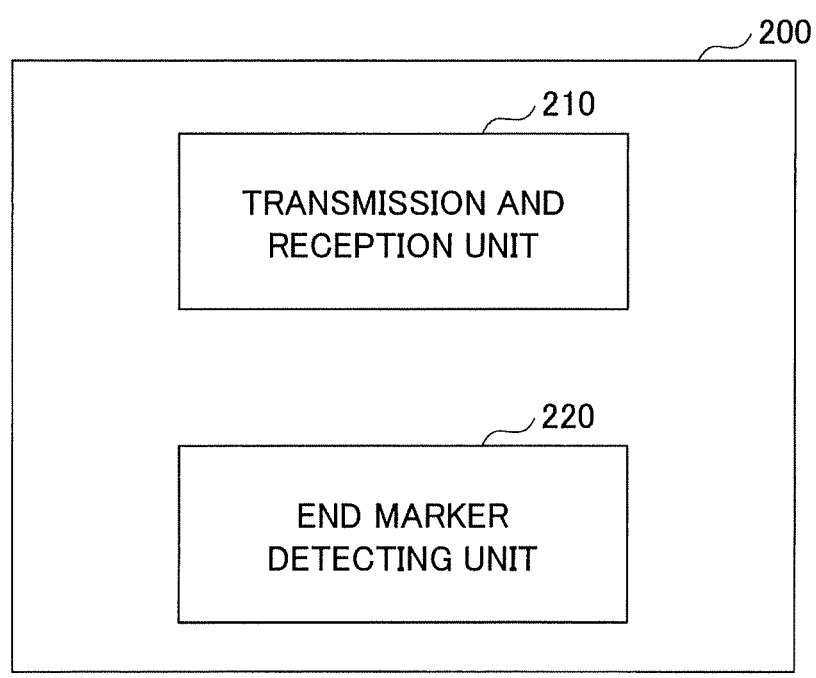
FIG. 5 is a block diagram illustrating a functional configuration of a base station according to one embodiment of the present invention.

Next, the target base station according to one embodiment of the present invention will be described with reference to FIG. 5. FIG. 5 is a block diagram illustrating a functional configuration of the base station according to one embodiment of the present invention.

As illustrated in FIG. 5, the target base station 200T has a transmission and reception unit 210 and an end marker detecting unit 220.

The transmission and reception unit 210 receives the data flow from the source base station 200S and the core network 100, and when the end marker of the data flow transmitted from the source base station 200S is received, the transmission and reception unit 210 starts to transmit the data flow transmitted from the core network 100 to the user equipment 50. In the flow-based handover control, the transmission and reception unit 210 receives the data flow having the flow identifier and the flow priority from the source base station 200S via the tunnel. Specifically, when the handover control for the user equipment 50 from the source base station 200S to the target base station 200T is performed, the transmission and reception unit 210 receives the data flow destined for the user equipment 50 which is transmitted from the core network 100 to the source base station 200S from the source base station 200S before the path switch, and directly receives the data flow destined for the user equipment 50 from the core network 100 after the path switch. As described above, one tunnel is set between the source base station 200S and the target base station 200T for each APN, and the data flow destined for the user equipment 50 which is transferred from the source base station 200S is transmitted via the tunnel. For the transferred data flow, the end marker is generated in accordance with an end marker generation rule to be described in detail below.

Until the end marker is received, the transmission and reception unit 210 transmits the data flow received from the source base station 200S to the user equipment 50, and buffers the new data received from the core network 100 in a buffer (not illustrated). Thereafter, upon receiving the end marker of the data flow, the transmission and reception unit 210 starts to transmit the data flow corresponding to the received end marker which is buffered in the buffer to the user equipment 50.

The end marker detecting unit 220 detects the end marker of the data flow transferred from the source base station 200S, and when the end marker is detected, the end marker detecting unit 220 notifies the transmission and reception unit 210 of the detected end marker. As will described below in detail, the end marker is generated in accordance with a generation rules based on one or more of the flow identifier, the flow priority, and the tunnel.

Figure 6:
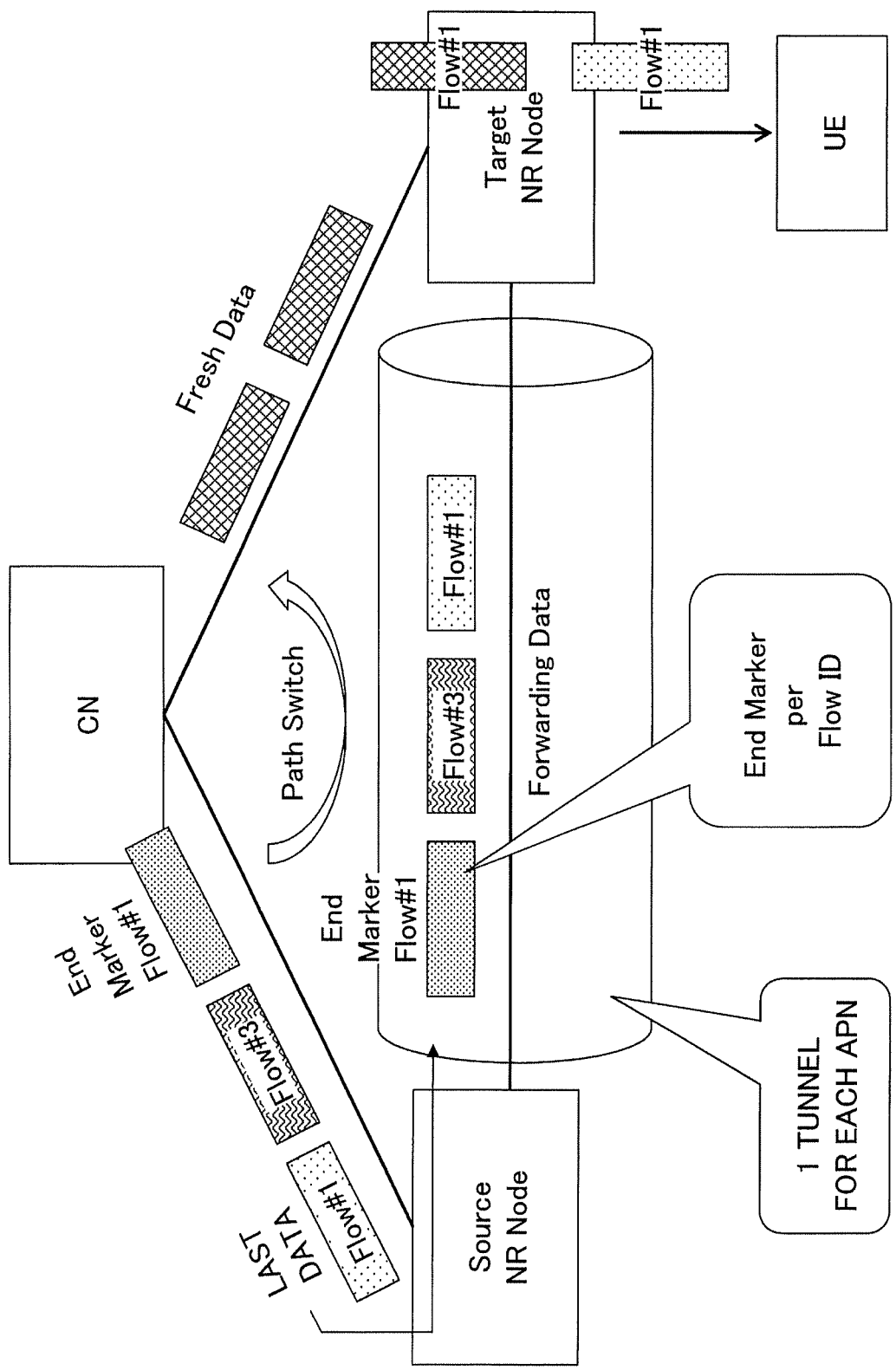
FIG. 6 is a schematic diagram illustrating an end marker generation scheme according to a first embodiment of the present invention.

Next, an end marker generation scheme according to a first embodiment of the present invention will be described with reference to FIG. 6. In the first embodiment, the core network 100 generates the end marker of the data flow for each flow identifier. FIG. 6 is a schematic diagram illustrating the end marker generation scheme according to the first embodiment of the present invention.

As illustrated in FIG. 6, upon receiving a handover request for the user equipment 50 from the source base station 200S to the target base station 200T, the flow control unit 110 switches the transmission path of the data flow destined for the user equipment 50 from the source base station 200S to the target base station 200T. At the time of the path switch, the end marker generating unit 120 generates the end marker of the data flow for each flow identifier. Specifically, as illustrated in FIG. 6, when the flow control unit 110 transmits the last data of a flow identifier #1 to the source base station 200S, the end marker generating unit 120 generate an end marker of the flow identifier #1 and transmits the end marker to the source base station 200S in order to notify of completion of the transfer of the data flow of the flow identifier #1. The source base station 200S transfers the data flow and the end marker received from the core network 100 to the target base station 200T via the tunnel set for each APN. In the target base station 200T, when the end marker detecting unit 220 detects the transferred end marker of the flow identifier #1, the transmission and reception unit 210 transmits the data flow of the flow identifier #1 transferred from the source base station 200S to the user equipment 50, then extracts the data flow having the flow identifier #1 from the buffered data flow received directly from the core network 100, and starts to transmit the extracted data flow having the flow identifier #1 to the user equipment 50. Thus, even when the data flows having different flow identifiers and flow priorities are received in the tunnel under the flow-based handover control, the target base station 200T can reorder the data flow received from the source base station 200S and the core network 100 for each flow identifier and transmit the reordered data flows to the user equipment 50.

For the sake of convenience of description, only one tunnel is set in an illustrated specific example, but it will be easily understood by those skilled in the art that the present embodiment is equally applicable to a plurality of tunnels.

Figure 7:
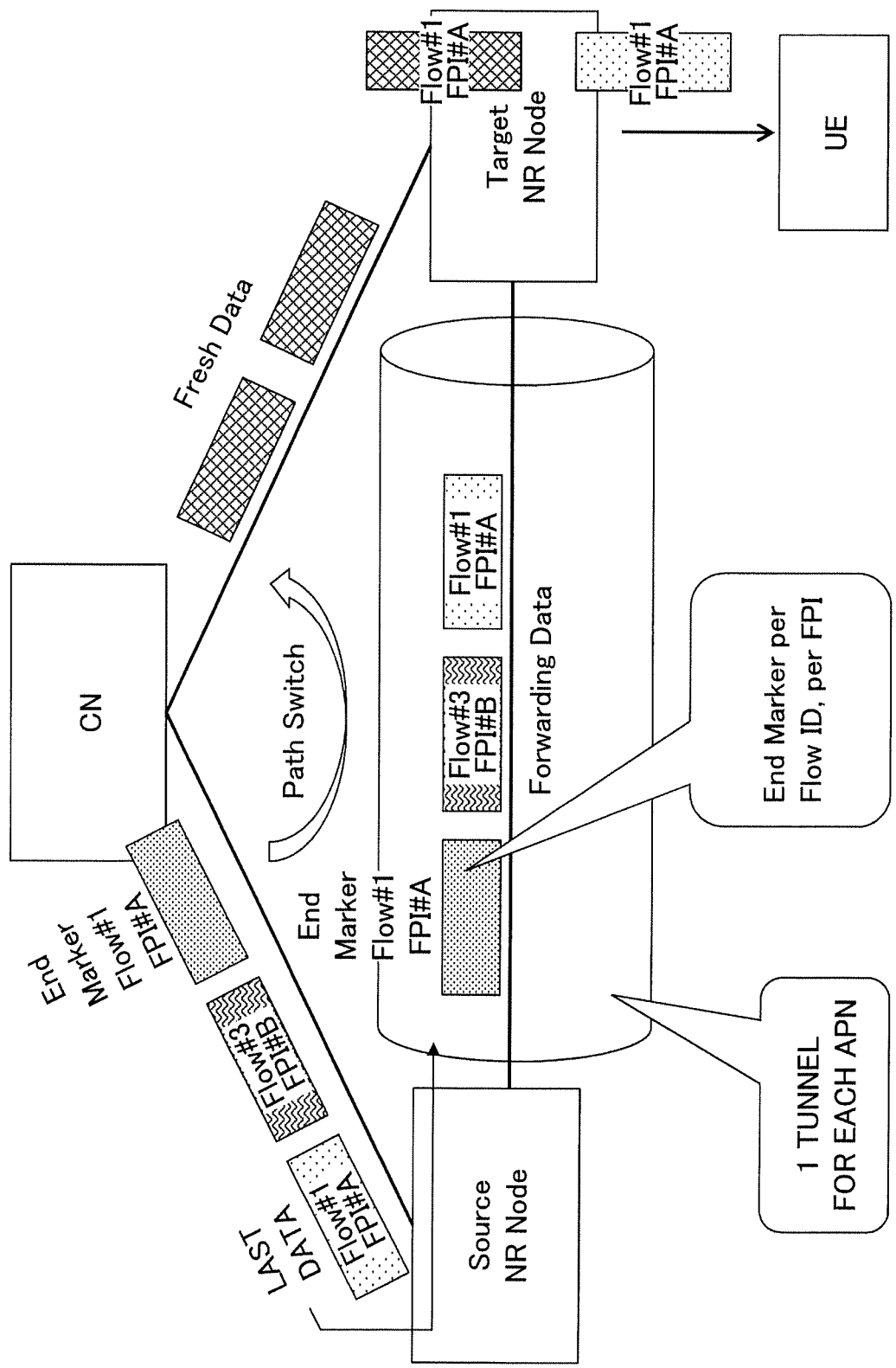
FIG. 7 is a schematic diagram illustrating an end marker generation scheme according to a second embodiment of the present invention.

Next, an end marker generation scheme according to a second embodiment of the present invention will be described with reference to FIG. 7. In the second embodiment, the core network 100 generates the end marker of the data flow for each combination of the flow identifier and the flow priority. FIG. 7 is a schematic diagram illustrating the end marker generation scheme according to the second embodiment of the present invention.

As illustrated in FIG. 7, upon receiving the handover request for the user equipment 50 from the source base station 200S to the target base station 200T, the flow control unit 110 switches the transmission route of the data flow destined for the user equipment 50 from the source base station 200S to the target base station 200T. At the time of the path switch, the end marker generating unit 120 generates the end marker of data flow for each combination of the flow identifier and the flow priority. Specifically, as illustrated in FIG. 7, when the flow control unit 110 transmits the last data of a flow identifier #1 and a flow priority #A to the source base station 200S, the end marker generating unit 120 generate an end marker of the flow identifier #1 and the flow priority #A and transmits the end marker to the source base station 200S in order to notify of completion of the transfer of the data flow of the flow identifier #1 and the flow priority #A. The source base station 200S transfers the data flow and the end marker received from the core network 100 to the target base station 200T via the tunnel set for each APN. In the target base station 200T, when the end marker detecting unit 220 detects the transferred end marker of the flow identifier #1 and the flow priority #A, the transmission and reception unit 210 transmits the data flow of the flow identifier #1 and the flow priority #A transferred from the source base station 200S to the user equipment 50, then extracts the data flow having the flow identifier #1 and the flow priority #A from the buffered data flow received directly from the core network 100, and starts to transmit the extracted data flow having the flow identifier #1 and the flow priority #A to the user equipment 50. Thus, even when the data flows having different flow identifiers and flow priorities are received in the tunnel under the flow-based handover control, the target base station 200T can reorder the data flow received from the source base station 200S and the core network 100 for each combination of the flow identifier and the flow priority and transmit the reordered data flows to the user equipment 50.

For the sake of convenience of description, only one tunnel is set in an illustrated specific example, but it will be easily understood by those skilled in the art that the present embodiment is equally applicable to a plurality of tunnels.

Figure 8:
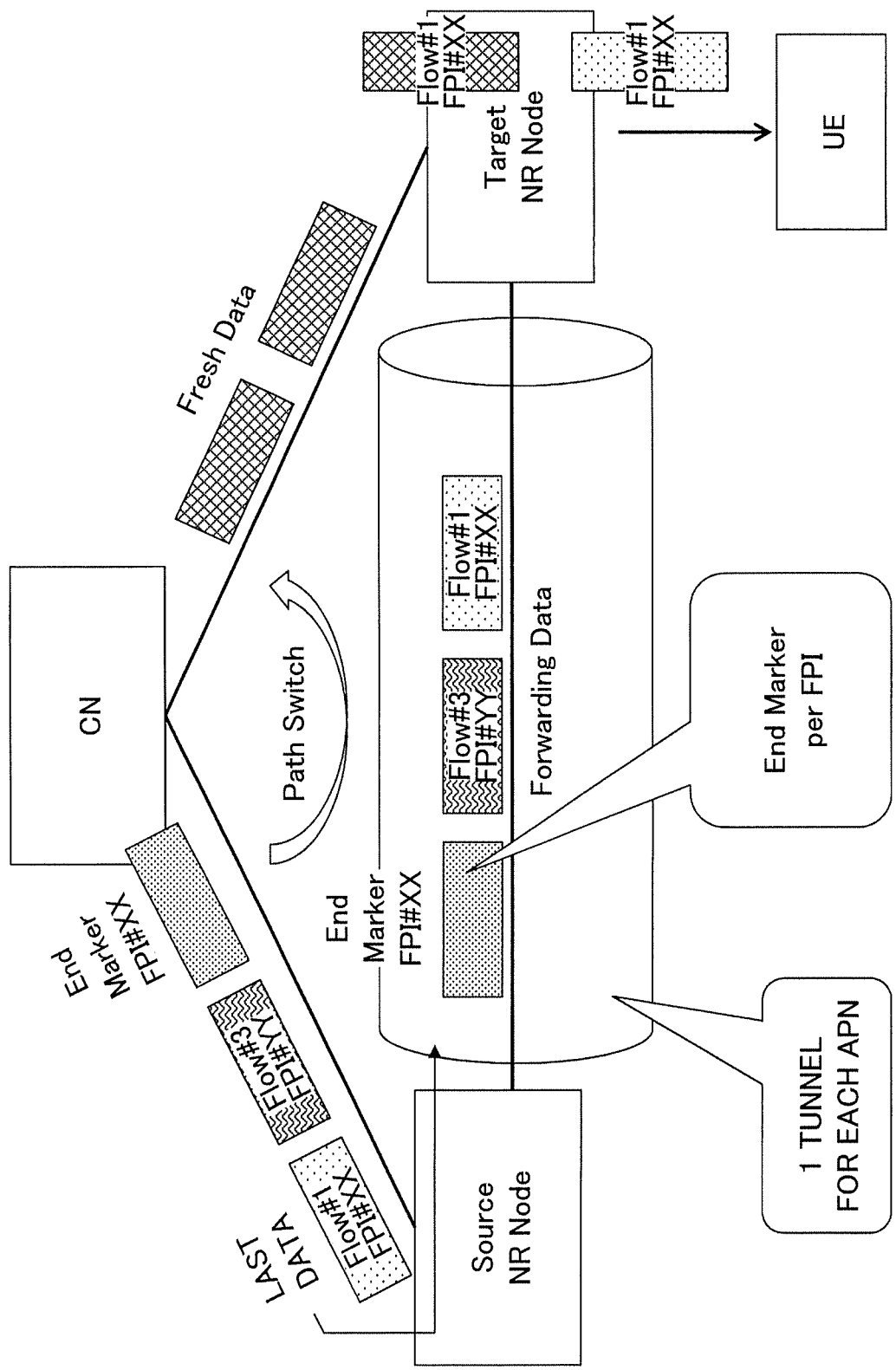
FIG. 8 is a schematic diagram illustrating an end marker generation scheme according to a third embodiment of the present invention.

Next, an end marker generation scheme according to a third embodiment of the present invention will be described with reference to FIG. 8. In the third embodiment, core network 100 generates the end marker of the data flow for each flow priority. FIG. 8 is a schematic diagram illustrating the end marker generation scheme according to the third embodiment of the present invention.

As illustrated in FIG. 8, upon receiving the handover request for the user equipment 50 from the source base station 200S to the target base station 200T, the flow control unit 110 switches the transmission route of the data flow destined for the user equipment 50 from the source base station 200S to the target base station 200T. At the time of the path switch, the end marker generating unit 120 generates the end marker of the data flow for each flow priority. Specifically, as illustrated in FIG. 8, when the flow control unit 110 transmits the last data of a flow priority #XX to the source base station 200S, the end marker generating unit 120 generate an end marker of the flow priority #XX and transmits the end marker to the source base station 200S in order to notify of completion of the transfer of the data flow of the flow priority #XX. The source base station 200S transfers the data flow and the end marker received from the core network 100 to the target base station 200T via the tunnel set for each APN. In the target base station 200T, when the end marker detecting unit 220 detects the transferred end marker of the flow priority #XX, the transmission and reception unit 210 transmits the data flow of the flow priority #XX transferred from the source base station 200S to the user equipment 50, then extracts the data flow having the flow priority #XX from the buffered data flow received directly from the core network 100, and starts to transmit the extracted data flow having the flow priority #XX to the user equipment 50. Thus, even when the data flows having different flow identifiers and flow priorities are received in the tunnel under the flow-based handover control, the target base station 200T can reorder the data flow received from the source base station 200S and the core network 100 for each flow priority and transmit the reordered data flows to the user equipment 50.

For the sake of convenience of description, only one tunnel is set in an illustrated specific example, but it will be easily understood by those skilled in the art that the present embodiment is equally applicable to a plurality of tunnels.

Figure 9:
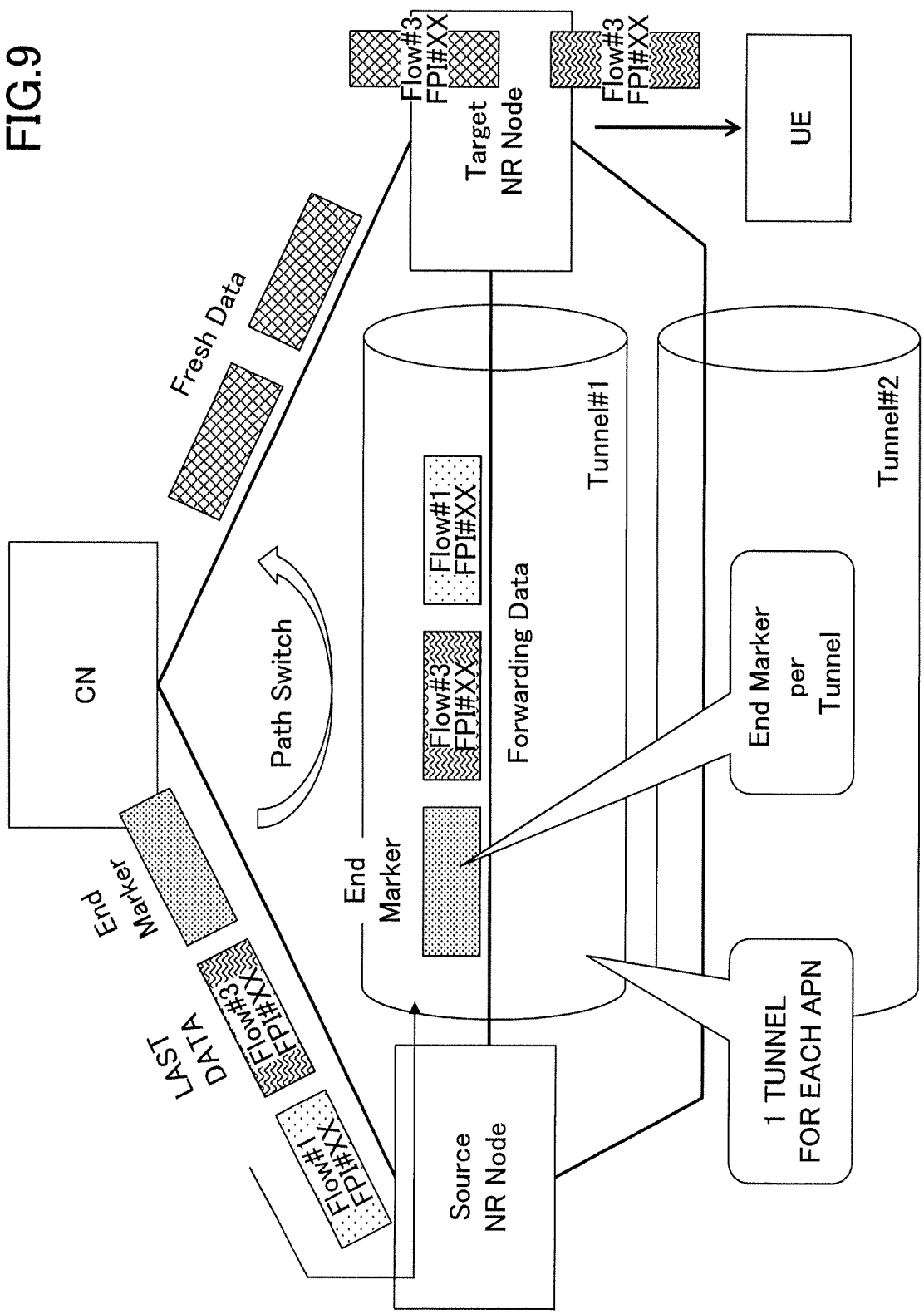
FIG. 9 is a schematic diagram illustrating an end marker generation scheme according to a fourth embodiment of the present invention.
Figure 10:
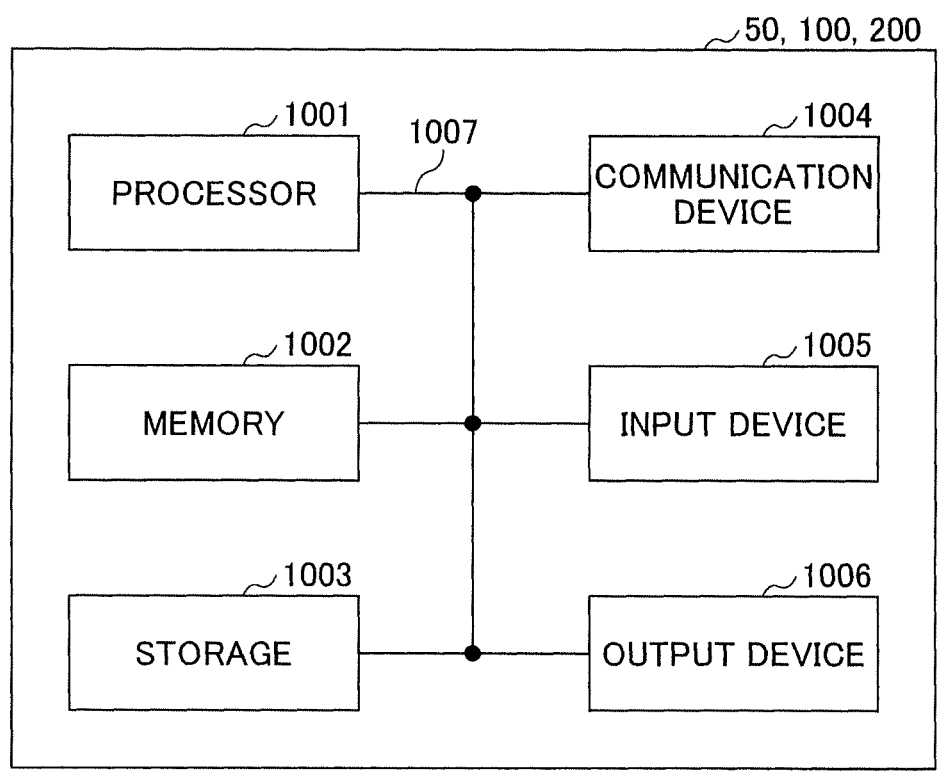
FIG. 10 is a block diagram illustrating a hardware configuration of each of a user equipment, a base station, and a core network according to one embodiment of the present invention.

Next, an end marker generation scheme according to a fourth embodiment of the present invention will be described with reference to FIG. 9. In the third embodiment, the core network 100 generates the end marker of the data flow for each tunnel. FIG. 9 is a schematic diagram illustrating the end marker generation scheme according to the fourth embodiment of the present invention.

As illustrated in FIG. 9, upon receiving the handover request for the user equipment 50 from the source base station 200S to the target base station 200T, the flow control unit 110 switches the transmission route of the data flow destined for the user equipment 50 from the source base station 200S to the target base station 200T. At the time of this path switch, the end marker generating unit 120 generates the end marker of the data flow for each tunnel. Specifically, as illustrated in FIG. 9, when the flow control unit 110 transmits the last data of a tunnel #1 to the source base station 200S, the end marker generating unit 120 generate an end marker of the tunnel #1 and transmits the end marker to the source base station 200S in order to notify of completion of the transfer of the data flow of the tunnel #1. The source base station 200S transfers the data flow and the end marker received from the core network 100 to the target base station 200T via the tunnel set for each APN. In the target base station 200T, when the end marker detecting unit 220 detects the transferred end marker of the tunnel #1, the transmission and reception unit 210 transmits the data flow of the tunnel #1 transferred from the source base station 200S to the user equipment 50, then extracts the data flow having the tunnel #1 from the buffered data flow received directly from the core network 100, and starts to transmit the extracted data flow having the tunnel #1 to the user equipment 50. Thus, even when the data flows having different flow identifiers and flow priorities are received in the tunnel under the flow-based handover control, the target base station 200T can reorder the data flow received from the source base station 200S and the core network 100 for each tunnel and transmit the reordered data flows to the user equipment 50.

In the block diagrams used in the description of the above embodiment, the blocks of the functional units are illustrated. The functional blocks (configuring units) are implemented by an arbitrary combination of hardware and/or software. A device of implementing each functional block is not particularly limited. In other words, each functional block may be implemented by one device which is physically and/or logically combined or may be implemented by a plurality of devices, that is, two or more devices which are physically and/or logically separated and are directly and/or indirectly connected (for example, a wired and/or wireless manner).

For example, each of the user equipment 50, the base station 200, and the core network 100 in one embodiment of the present invention may function as a computer that performs the process of the radio communication method of the present invention. FIG. 11 is a block diagram illustrating a hardware configuration of each of the user equipment 50, the base station 200, and the core network 100 according to one embodiment of the present invention. Each of the user equipment 50, the base station 200, and the core network 100 described above may be physically configured as a computer device that includes a processor 1001, a memory 1002, a storage 1003, a communication device 1004, an input device 1005, an output device 1006, a bus 1007, and the like.

In the following description, the term "device" can be replaced with a circuit, a device, a unit, or the like. The hardware configuration of each of the user equipment 50, the base station 100, and the core network 200 may be configured to include one or more devices illustrated in the drawing or may be configured without including some devices.

Each function in each of the user equipment 50, the base station 200, and the core network 100 is implemented such that predetermined software (program) is read on hardware such as the processor 1001 and the memory 1002, and the processor 1001 performs an operation and controls communication by the communication device 1004 and reading and/or writing of data in the memory 1002 and the storage 1003.

For example, the processor 1001 operates an operating system and controls the entire computer. The processor 1001 may be configured with a central processing unit (CPU) including an interface with a peripheral device, a control device, an operation device, a register, and the like. For example, each component of the base station 200 and the core network 100 described above may be implemented by the processor 1001.

Further, the processor 1001 reads a program (a program code), a software module, and data from the storage 1003 and/or the communication device 1004 out to the memory 1002, and performs various kinds of processes according to them. A program causing a computer to execute at least some of the operations described in the above embodiment is used as the program. For example, the process performed by each component in each of the user equipment 50, the base station 200, and the core network 100 may be implemented by a control program which is stored in the memory 1002 and operates on the processor 1001, or the other functional blocks may be similarly implemented. Various kinds of processes have been described as being performed by one processor 1001 but may be performed simultaneously or sequentially by two or more processors 1001. The processor 1001 may be implemented by one or more chips. The program may be transmitted from a network via an electric communication line.

The memory 1002 is a computer readable recording medium and configured with at least one of a read only memory (ROM), an erasable programmable ROM (EPROM), an electrically erasable programmable ROM (EEPROM), a random access memory (RAM), and the like. The memory 1002 is also referred to as a "register," a "cache," a "main memory," or the like. The memory 1002 can store programs (program codes), software modules, or the like which are executable for carrying out the radio communication method according to an embodiment of the present embodiment.

The storage 1003 is a computer-readable recording medium and may be configured with, for example, at least one of an optical disk such as a compact disc ROM (CD-ROM), a hard disk drive, a flexible disk, a magneto-optical disk (for example, a compact disk, a digital versatile disk, or a Blu-ray (registered trademark) disc, a smart card, a flash memory (for example, a card, a stick, or a key drive), a floppy (registered trademark) disk, a magnetic strip, and the like. The storage 1003 is also referred to as an "auxiliary storage device." The storage medium may be, for example, a database, a server, or any other appropriate medium including the memory 1002 and/or the storage 1003.

The communication device 1004 is hardware (a transmission and reception device) for performing communication between computers via a wired and/or wireless network and is also referred to as a "network device," a "network controller," a "network card," a "communication module," or the like. For example, it may be implemented by each component of the base station 200 and the core network 100.

The input device 1005 is an input device that receives an input from the outside (such as a keyboard, a mouse, a microphone, a switch, a button, a sensor, or the like). The output device 1006 is an output device that performs an output to the outside (for example, a display, a speaker, an LED lamp, or the like). The input device 1005 and the output device 1006 may be integratedly configured (for example, a touch panel).

The respective devices such as the processor 1001 and the memory 1002 are connected via the bus 1007 to communicate information with each other. The bus 1007 may be configured with a single bus or may be configured with different buses between the devices.

Further, each of the user equipment 50, the base station 200, and the core network 100 may be configured to include hardware such as a microprocessor, a digital signal processor (DSP), an application specific integrated circuit (ASIC), a programmable logic device (PLD), or a field programmable gate array (FPGA) or all or some of the functional blocks may be implemented by hardware. For example, the processor 1001 may be implemented by at least one of these pieces of hardware.

A notification of information is not limited to the aspect or embodiment described in this specification and may be given by any other method. For example, the notification of information may be given physical layer signaling (for example, Downlink Control Information (DCI), uplink control information (DCI)), higher layer signaling (for example, radio resource control (RRC) signaling, medium access control (MAC) signaling, broadcast information (master information block (MIB), system information block (SIB))), other signals, or a combination thereof. Further, the RRC signaling may be referred to as an "RRC message" and may be, for example, an RRC connection setup message, an RRC connection reconfiguration message, or the like.

Each aspect and embodiment described in this specification is applicable to LTE, LTE-A, SUPER 3G, IMT-Advanced, 4G, 5G, future radio access (FRA), W-CDMA (registered trademark), GSM (registered trademark), CDMA2000, ultra mobile broadband (UMB), IEEE 802.11 (Wi-Fi), IEEE 802.16 (WiMAX), IEEE 802.20, ultra-wide-band (UWB), Bluetooth (registered trademark), and systems using any other appropriate systems and/or next generation systems expanded on the basis of the systems.

The processing procedures, the sequences, the flowcharts, and the like of the respective aspects/embodiments described in this specification may be reversed in order unless there is a contradiction. For example, the method described in this specification presents elements of various steps in an exemplary order and is not limited to a presented specific order.

In this specification, a specific action that is supposed to be performed by the base station 200 may be performed by an upper node in some cases. In the network configured with one or more network nodes including the base station, various actions performed for communication with the terminal can be obviously performed by the base station and/or any network node (for example, an MME, an S-GW, or the like is considered, but it is not limited thereto) other than the base station. The example in which the number of network nodes excluding the base station is one has been described above, but a combination of a plurality of other network nodes (for example, an MME and an S-GW) may be provided.

Information and the like can be output from the higher layer (or the lower layer) to the lower layer (or the higher layer). Information and the like may be input/output via a plurality of network nodes.

Input and output information and the like may be stored in a specific place (for example, a memory) or may be managed through a management table. Input and output information and the like may be overwritten, updated, or additionally written. Output information and the like may be deleted. Input information and the like may be transmitted to another device.

The determination may be performed in accordance with a value (0 or 1) indicated by one bit, may be performed in accordance with a Boolean value (true or false), or may be performed by a comparison of numerical values (for example, a comparison with a value).

Each aspect/embodiment described in this specification may be used alone, may be used in combination, or may be switched in association with execution. Further, a notification of predetermined information (for example, a notification indicating "being X") is not limited to one which is performed explicitly and may be performed implicitly (for example, a notification of predetermined information is not given).

Although the present invention has been described above in detail, it is obvious to those having skill in the art that the present invention is not limited to the embodiments described in this specification. The present invention can be carried out as revisions and modifications without departing from the gist and scope of the present invention decided in claims set forth below. Therefore, the description of this specification is intended to be exemplary and does not have any restrictive meaning to the present invention.

Software can be interpreted widely to mean a command, a command set, a code, a code segment, a program code, a program, a subprogram, a software module, an application, a software application, a software package, a routine, a subroutine, an object, an executable file, an execution thread, a procedure, a function, and the like regardless of whether software is called software, firmware, middleware, a microcode, a hardware description language, or any other name.

Further, software, commands, and the like may be transmitted and received via a transmission medium. For example, when software is transmitted from a web site, a server, or any other remote source using a wired technology such as a coaxial cable, a fiber optic cable, a twisted pair, or a digital subscriber line (DSL) and/or a wireless technology such as infrared rays, a radio wave, or a microwave, the wired technology and/or the wireless technology are included in a definition of a transmission medium.

Information, signals, and the like described in this specification may be indicated using any one of a variety of different techniques. For example, data, instructions, commands, information, signals, bits, symbols, chips, and the like which are mentioned throughout the above description may be indicated by voltages, currents, electromagnetic waves, magnetic particles, optical fields or photons, or an arbitrary combination thereof.

The terms described in this specification and/or terms necessary for understanding this specification may be replaced with terms having the same or similar meanings. For example, a channel and/or a symbol may be a signal. Further, a signal may be a message. Further, a component carrier (CC) may be referred to as a "carrier frequency," a "cell," or the like.

The terms "system" and "network" used in this specification are used interchangeably.

Further, information, parameters, and the like described in this specification may be indicated by absolute values, may be indicated by relative values from predetermined values, or may be indicated by corresponding other information. For example, radio resources may be those indicated by an index.

The names used for the above-described parameters are not limited in any respect. Further, mathematical formulas or the like using the parameters may be different from those explicitly disclosed in this specification. Since various channels (for example, the PUCCH, the PDCCH, and the like) and information elements (for example, the TPC or the like) can be identified by suitable names, the various names allocated to the various channels and the information elements are not limited in any respect.

The base station can accommodate one or more (for example, three) cells (also referred to as "sectors"). When the base station accommodates a plurality of cells, the entire coverage area of the base station can be divided into a plurality of smaller areas, and each smaller area can provide communication service through a base station subsystem (for example, a small indoor base station remote radio head (RRH)). The term "cell" or "sector" refers to part or all of the coverage area of the base station and/or the base station subsystem that performs communication service in the coverage. Furthermore, the terms "base station," "eNB," "cell," and "sector" can be used interchangeably in this specification. The base station is also referred to as a fixed station, a Node B, eNodeB (eNB), an access point, a Femto cell, a small cell, or the like.

The mobile station UE is also referred to as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or other appropriate terms.

The terms "determining" and "deciding" used in this specification may include a wide variety of actions. For example, "determining" and "deciding" may include, for example, events in which events such as calculating, computing, processing, deriving, investigating, looking up (for example, looking up in a table, a database, or another data structure), or ascertaining are regarded as "determining" or "deciding." Further, "determining" and "deciding" may include, for example, events in which events such as receiving (for example, receiving information), transmitting (for example, transmitting information), input, output, or accessing (for example, accessing data in a memory) are regarded as "determining" or "deciding." Further, "determining" and "deciding" may include, for example, events in which events such as resolving, selecting, choosing, establishing, or comparing are regarded as "determining" or "deciding." In other words, "determining" and "deciding" may include events in which a certain operation is regarded as "determining" or "deciding."

Terms "connected," "coupled," or variations thereof means any direct or indirect connection or coupling between two or more elements and may include the presence of one or more intermediate elements between two elements which are "connected" or "coupled." The coupling or the connection between the elements may be physical, logical, or a combination thereof. When used in this specification, two elements may be considered to be "connected" or "coupled" with each other using one or more electric wires, cables and/or a printed electrical connection or using electromagnetic energy such as electromagnetic energy having a wavelength in a radio frequency domain, a microwave region, or a light (both visible and invisible) region as non-limiting and non-exhaustive examples.

A reference signal may be abbreviated as RS and may be called a pilot, depending on a standard to be applied.

A phrase "on the basis of" used in this specification is not limited to "on the basis of only" unless otherwise stated. In other words, a phrase "on the basis of" means both "on the basis of only" and "on the basis of at least."

Any reference to an element using a designation such as "first," "second," or the like used in this specification does not generally restrict quantities or an order of those elements. Such designations can be used in this specification as a convenient method of distinguishing between two or more elements. Thus, reference to the first and second elements does not mean that only two elements can be adopted there, or first element must precede the second element in a certain form.

Further, "means" in the configuration of each of the above devices may be replaced with "unit", "circuit", "device", or the like.

"Including," "comprising," and variations thereof are intended to be comprehensive, similarly to a term "equipped with" as long as the terms are used in this specification or claims set forth below. Furthermore, the term "or" used in this specification or claims set forth below is intended not to be an exclusive disjunction.

A radio frame may be configured with one or more frames in the time domain. Each of one or more frames in the time domain is also referred to as a subframe. Further, the subframe may be configured with one or more slots in the time domain. Further, the slot may be configured with one or more symbols (OFDM symbols, SC-FDMA symbols, or the like) in the time domain. Each of the radio frame, the subframe, the slot, and the symbol indicate a time unit when signals are transmitted. The radio frame, the subframe, the slot, and the symbol may have different corresponding names. For example, in an LTE system, the base station performs scheduling to allocate radio resources (a frequency bandwidth, transmission power or the like usable in each mobile station) to each mobile station. A minimum time unit of scheduling may be referred to as a transmission time interval (TTI). For example, one subframe may be referred to as a TTI, a plurality of consecutive subframes may be referred to as a TTI, or one slot may be referred to as a TTI. The resource block (RB) is a resource allocation unit in the time domain and the frequency domain and may include one or more consecutive subcarriers in the frequency domain. In the time domain of the resource block, one or more symbols may be included, and one slot, one subframe, or one TTI may be used. Each of one TTI and one subframe may be configured with one or more resource blocks. The structure of the radio frame described above is merely an example, and the number of subframes included in the radio frame, the number of slots included in the subframe, the number of symbols and resource blocks included in the slot, and the number of subcarriers included in the resource block can be changed variously.

The embodiments of the present invention have been described above in detail, but the present invention is not limited to the specific embodiments described above, and various changes and modifications can be made within the scope of the gist of the present invention set forth in claims.

The present application is based on and claims priority to Japanese patent application No. 2016-158761 filed on Aug. 12, 2016, the entire contents of which are hereby incorporated by reference.

EXPLANATIONS OF LETTERS OR NUMERALS 10 radio communication system
50 user equipment
100 core network
110 flow control unit
120 end marker generating unit
200 base station
210 transmission and reception unit
220 end marker detecting unit

The invention claimed is:

1. A core network, comprising:
a flow control unit that switches a path of a data flow having a flow identifier and
a flow priority from a first base station of a handover source to a second base station; and
an end marker generating unit that generates, for each tunnel,
an end marker corresponding to a data flow transferred from the first base station of a handover source to the second base station via a tunnel.

2. The core network according to claim 1, wherein the end marker generating unit generates the end marker corresponding to the data flow for each combination of the flow identifier and the flow priority.

3. The core network according to claim 1, wherein the end marker generating unit generates the end marker corresponding to the data flow for each tunnel.

4. A base station, comprising:
a transmission and reception unit that receives a data flow from a base station of a handover source and
a core network and receives an end marker corresponding to the data flow transmitted from the base station of the handover source; and
an end marker detecting unit that detects the end marker corresponding to the data flow transferred from the base station of the handover source,
wherein the transmission and reception unit receives the data flow having a flow identifier and
a flow priority from the base station of the handover source via a tunnel, and
the end marker detecting unit detects the end marker generated for each tunnel.

* * * * *